April 1, 1930.  M. H. BENNETT  1,753,001
CONDENSER
Filed July 7, 1927
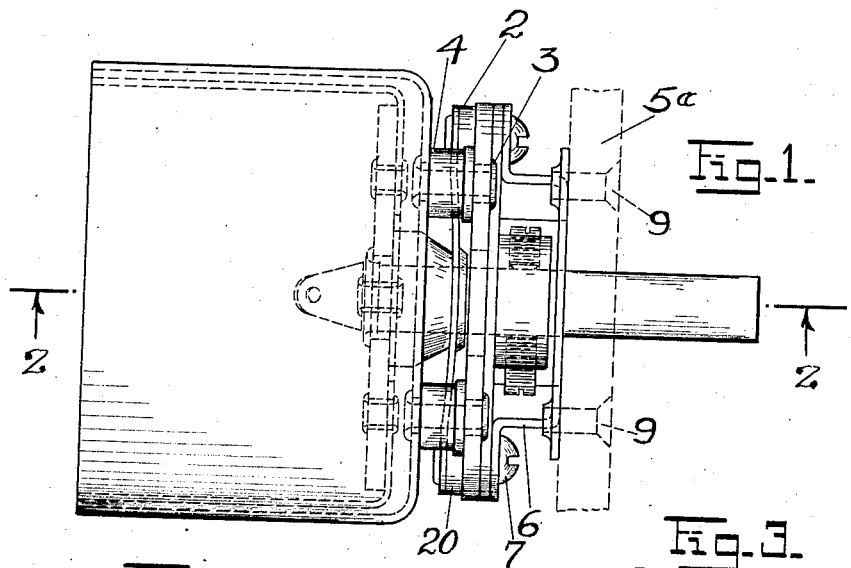
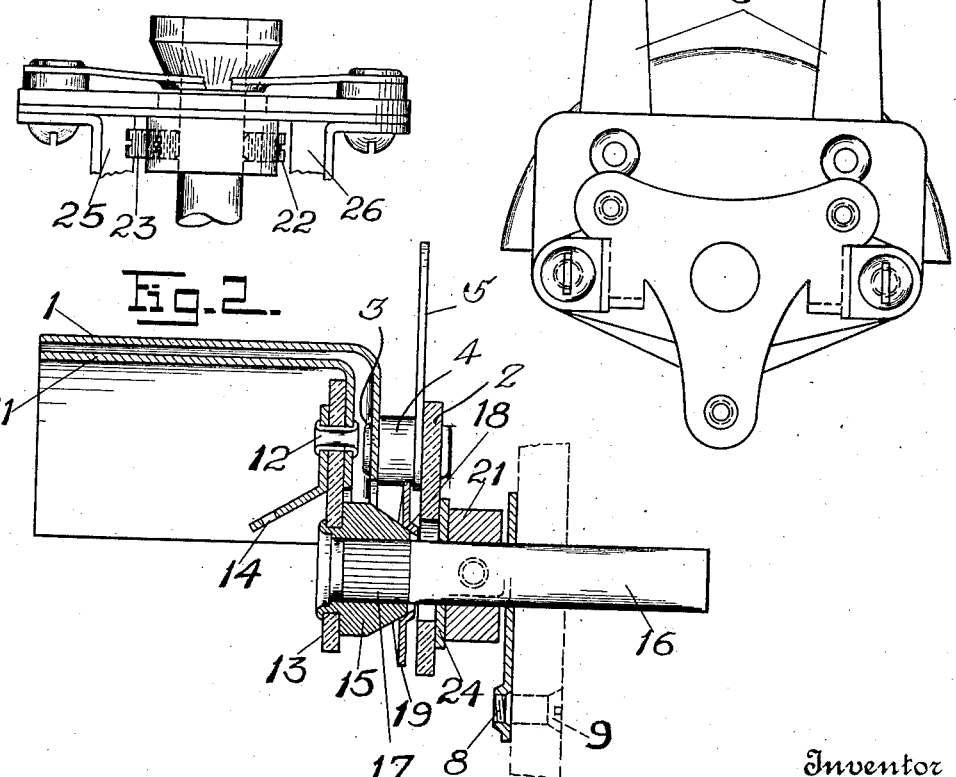
Inventor
Morris H. Bennett
By his Attorney Patented Apr. 1, 1930

1,753,001

UNITED STATES PATENT OFFICE

MORRIS H. BENNETT, OF WATERBURY, CONNECTICUT, ASSIGNOR TO SCOVILL MANUFACTURING COMPANY, OF WATERBURY, CONNECTICUT, A CORPORATION OF CONNECTICUT

CONDENSER

Application filed July 7, 1927. Serial No. 203,899.

This invention relates to condensers and more particularly to condensers for use in radio circuits.

It is an object of this invention to provide a condenser which shall be particularly well adapted for use as a vernier or an auxiliary condenser in conjunction with a main condenser for controlling the fine adjustments necessary for accurate tuning in radio receiving sets.

In the drawings, wherein is illustrated a preferred embodiment of the invention,—

Figure 1 is a top view of a vernier condenser;

Figure 2 is a section taken along the line 2—2 of Fig. 1;

Figure 3 is a front view of the condenser shown in Fig. 1; and

Figure 4 is a detailed view of the improved bearing used in the condenser of Fig. 1.

A condenser constructed in accordance with this invention comprises a stator member formed of a single semi-cylindrical cup-shaped member 1 which is secured to a substantially rectangular insulating plate 2 by means of eyelets 3, spacing collars 4 being interposed between the base of the cup and the insulating plate 2. Also interposed between the insulating plate and each spacing collar 4 is an upstanding stator terminal lug 5 having a suitable eye for the attachment of a conductor. Insulating plate 2 is mounted on a panel 5ᵃ by means of a frame 6 to which the plate 2 is secured by screws 7, also holding the rotor bearing, as will hereinafter appear. Frame member 6 is provided with screw-receiving, tapped holes 8 adapted to take mounting screws 9 extending through the panel 5ᵃ, the holes 8 being drifted to provide a larger purchase for the screw threads.

The rotor comprises a semi-cylindrical cup-shaped member 11 of a slightly smaller diameter than that of the stator and adapted for rotation within the stator. Cup 11 is preferably mounted by means of spun eyelets 12 on an insulating plate 13, a rotor terminal 14 being mounted on the opposite side of plate 13 by means of one of the eyelets 12. Plate 13 is centrally bored to receive the reduced end of a shaft carrier 15 which is held to the plate by spinning. A shaft 16 supported by carrier 15, its end being corrugated as at 17, is forced tightly into a central bore in carrier 15. The outer surface of carrier 15 is partly conical tapering away from its place of attachment to plate 13 and constitutes a bearing member for shaft 16. The conical portion is adapted to bear against a conical spring seat 18 countersunk or drifted in a spring member 19 which is supported at its opposite ends on plate 2 by means of screws 7, spacing bushings 20 being provided to permit the spring to have free action. The shaft, it will be noted, projects through openings in spring 19, plate 2, frame member 6 and panel 5ᵃ and receives a knob and dial of any suitable type at its opposite end. Mounted upon and keyed to the shaft 16 between the plate 2 and frame 6 is a collar 21, set screws 22 and 23 being provided for this purpose. Collar 21 bears against a metallic plate 24 held against plate 2 by screws 7. The tension of the bearing surface of carrier 15 on shaft 16 in its seat 18 may be adjusted by changing the location of the collar 21 on the shaft, spring plate 19 giving sufficiently to allow for such adjustment.

One of the set screws 23 in collar 21 is made longer than the other to act as a stop for the rotor, projections 25 and 26 on frame member 6 cooperating with the screw to this end.

With the construction herein described, there is provided a vernier condenser having but a single bearing. It is to be noted that frame 6 has a flat central portion 6ᵃ which lies flat against the surface of panel 5ᵃ and is centrally drilled with a hole 6ᵇ through which shaft 16 snugly extends. This construction maintains the shaft 16 in perfect alignment preventing it from being pushed sideways upon assembly or during use and thereby lifting the cone bearing from its seat. Because of the shape and relative position of the rotor and stator elements, very fine and accurate adjustments are possible. Besides, little or no play in the bearing will exist because the conical bearing 15 will be held snugly in its spring seat 18 by means of collar 21. Any set occurring in spring 18 may be compensated for by merely moving the collar 21 further along shaft 16 toward the plate 24. Because of the fact that the condenser parts are self-aligning, this instrument may be manufactured very cheaply, the parts being made up separately and assembled by unskilled labor.

What is claimed is:

1. In a vernier condenser, a stator comprising a single semi-cylindrical element, a rotor plate within said stator and similarly formed, a frame member on which said stator is mounted, a shaft carrying said rotor, a bearing on said rotor shaft comprising a conical bushing mounted thereon, a spring member on said frame member having a conical seat, and a collar on the shaft on the opposite side of said frame for maintaining said bushing in the seat.

2. In a vernier condenser, a stator comprising a single semi-cylindrical element, a rotor plate within said stator and similarly formed, a frame member on which said stator is mounted, a shaft carrying said rotor, a bearing on said rotor shaft comprising a conical bushing mounted thereon, a spring member on said frame member having a conical seat, and a collar on the shaft on the opposite side of said frame for maintaining said bushing in the seat, said collar having a bearing surface and a plate against which the surface of said collar bears.

3. In a vernier condenser, a stator comprising a single semi-cylindrical element, a rotor plate within said stator and similarly formed, a frame member on which said stator is mounted, a shaft carrying said rotor, a bearing for said rotor shaft comprising a conical bushing mounted thereon, a spring member on said frame member having a conical seat, and means to maintain said bearing in said seat comprising a collar, set screws for adjustably securing said collar on said shaft, and extensions on said frame member, one of said set screws cooperating with said extensions to limit the rotary movement of said shaft.

4. In a vernier condenser, a stator comprising a single semi-cylindrical element, a rotor plate within said stator and similarly formed, a frame member on which said stator is mounted, a shaft, means to mount said rotor plate on said shaft comprising a holding member having a conical outer surface, a spring member having a conical seat formed therein for receiving said holding member, a collar adjustably mounted on said shaft and having a bearing surface and a bearing plate carried on said frame for cooperating with said collar to maintain said conical holding member on said seat.

5. In a vernier condenser, a stator comprising a single semi-cylindrical element, a rotor plate within said stator and similarly formed, a frame member on which said stator is mounted, a shaft carrying said rotor, a bearing for said rotor shaft comprising a conical bushing mounted thereon, a spring member on said frame member having a conical seat, and means to maintain said bearing in said seat comprising a collar, set screws for adjustably securing said collar on said shaft, said frame member being provided with a flat portion having a bore to receive the shaft and prevent its sidewise motion.

6. In a vernier condenser, a stator, a rotor, a frame member on which the stator is mounted, a shaft carrying the rotor, a bearing for the rotor comprising a conical bushing mounted thereon, a spring member on said frame member having a conical seat to receive the bushing, and means on the shaft on the opposite side of said frame to retain the shaft in axial position with the bushing in the spring member.

In testimony whereof, I have hereunto set my hand.

MORRIS H. BENNETT.